United States Patent
Nowak-Przygodzki et al.

(10) Patent No.: US 12,406,676 B2
(45) Date of Patent: Sep. 2, 2025

(54) ASSISTANT DELEGATION OF REQUEST FULFILLMENT TO OTHER DEVICES

(71) Applicant: GOOGLE LLC, Mountain View, CA (US)

(72) Inventors: Marcin Nowak-Przygodzki, Bäch (CH); Andrei Giurgiu, Zurich (CH); Mugurel-Ionut Andreica, Adliswil (CH); Joseph Lange, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 184 days.

(21) Appl. No.: 18/104,748

(22) Filed: Feb. 1, 2023

(65) Prior Publication Data

US 2024/0257817 A1 Aug. 1, 2024

(51) Int. Cl.
*G10L 15/22* (2006.01)
*G06F 3/16* (2006.01)
*G10L 17/22* (2013.01)

(52) U.S. Cl.
CPC .............. *G10L 17/22* (2013.01); *G06F 3/167* (2013.01)

(58) Field of Classification Search
CPC .......... G10L 15/22; G10L 15/30; G06F 3/167
See application file for complete search history.

(56) References Cited

U.S. PATENT DOCUMENTS

| | | | |
|---|---|---|---|
| 10,547,729 B2 * | 1/2020 | Choi | G06F 3/04817 |
| 10,867,604 B2 * | 12/2020 | Smith | G10L 15/22 |
| 11,038,934 B1 * | 6/2021 | Hansen | G10L 15/22 |
| 11,443,744 B2 * | 9/2022 | Kang | G10L 15/083 |
| 2015/0169284 A1 | 6/2015 | Quast et al. | |
| 2019/0266338 A1 * | 8/2019 | Jeong | G06F 12/145 |
| 2021/0350799 A1 * | 11/2021 | Hansen | G10L 15/22 |
| 2022/0038417 A1 | 2/2022 | Ly | |

FOREIGN PATENT DOCUMENTS

WO 2018208506 11/2018

OTHER PUBLICATIONS

European Patent Office; International Search Report and Written Opinion issued in Application No. PCT/US2023/036882; 14 pages; dated Feb. 13, 2024.

* cited by examiner

Primary Examiner — Daniel Abebe
(74) Attorney, Agent, or Firm — Gray Ice Higdon

(57) ABSTRACT

Techniques are described herein for delegation of request fulfillment, by an assistant, to other devices. A method includes: receiving, by a first device, a request from a first user; identifying, based on the request from the first user, (i) an action corresponding to the request and (ii) a first parameter corresponding to the action; determining that fulfillment of the action is to be delegated to a device other than the first device; in response: selecting, as the device other than the first device, a second device on which an application corresponding to the action is installed; identifying, by the first device, based on the first parameter and information associated with an account of the first user, a first disambiguated parameter corresponding to the action; and sending, to the second device, a command that specifies the action and the first disambiguated parameter, to cause the second device to fulfill the action.

20 Claims, 4 Drawing Sheets

ASSISTANT DELEGATION OF REQUEST FULFILLMENT TO OTHER DEVICES

BACKGROUND

Humans can engage in human-to-computer interactions with interactive software applications referred to herein as "automated assistants". For example, a human (which when interacting with an automated assistant may be referred to as a "user") may provide an input to the automated assistant that can cause the automated assistant to generate and provide responsive output, to control one or more smart devices, and/or to perform one or more other functionalities. The input provided by the user can be, for example, a touch input (e.g., via a touchscreen), a gesture (e.g., detected via a camera), and/or a spoken natural language input (i.e., utterance detected via microphone(s)), which may in some cases be converted into text (or other semantic representation) and then further processed.

Many users may engage automated assistants using multiple client devices. For example, some users may possess a coordinated "ecosystem" of client devices such as one or more smartphones, one or more tablet computers, one or more wearable computing devices, one or more smart televisions, one or more standalone assistant-centric interactive speakers, and one or more standalone assistant-centric interactive displays with speaker(s), among other client devices. A user may engage in human-to-computer dialog with an automated assistant using any of these client devices (assuming an automated assistant client is installed).

Techniques exist to enable user(s) (e.g., a single user, multiple users in a family, co-workers, co-inhabitants, etc.) to utilize an automated assistant client running on a client device to fulfill a request by causing another application installed on the client device to perform an action corresponding to the request. For example, a user may utilize an automated assistant client to send a message to another user in response to a request from the user that is received by the automated assistant client running on the client device, using a messaging application corresponding to the request that is present on the particular client device on which the automated assistant client that received the request is running.

However, such techniques present drawbacks such as low reliability, as an automated assistant client may not be able to cause an application to perform an action to fulfill a request, if an application corresponding to the request is not installed and/or is not logged in on the particular client device on which the automated assistant client that received the request is running. Further, such techniques can burden computational and/or network resources, by requiring applications used for fulfilling requests to be installed on additional client devices, even if the applications are already installed on another client device.

SUMMARY

Implementations disclosed herein relate to delegation of request fulfillment, by an automated assistant, to other devices. In some implementations, a request (e.g., included in an utterance spoken by a person) may be received by a first automated assistant client running on a first client device. The first automated assistant client may determine that fulfillment of the request is to be delegated to a second client device, e.g., based on an application used to fulfill the request not being installed on the first client device, or based on fulfillment of the request requiring an application used to fulfill the request being in a logged-in state but not being in the logged-in state on the first client device. In response to determining that fulfillment of the request is to be delegated to the second client device, the first automated assistant client running on the first client device may send, to the second client device, a command that specifies an action to be performed by the application used to fulfill the request, to cause the application that is installed on the second client device to perform the action.

In other implementations, the first automated assistant client may determine that fulfillment of the request is to be delegated to a virtual copy of a second client device, e.g., based on an application used to fulfill the request not being installed on the first client device, or based on fulfillment of the request requiring an application used to fulfill the request being in a logged-in state but not being in the logged-in state on the first client device. In response to determining that fulfillment of the request is to be delegated to the virtual copy of the second client device, the first automated assistant client running on the first client device may send, to the virtual copy of the second client device, a command that specifies an action to be performed by the application used to fulfill the request, to cause the application that is installed on the virtual copy of the second client device to perform the action.

In some implementations, reliability of an automated assistant client may be improved, by providing a mechanism for an automated assistant client to fulfill requests that require an application that is not installed on a client device on which the automated assistant client is running. Additionally, in some implementations, reliability of an automated assistant client may be improved, by providing a mechanism for an automated assistant client to fulfill requests that require an application to be in a logged-in state, but the application is not in the logged-in state on a client device on which the automated assistant client is running. In some implementations, computational and/or network resources may be more efficiently utilized, by avoiding or reducing the need for installation of applications used for fulfilling requests on additional client devices, when the applications are already installed on another client device.

In various implementations, a method implemented by one or more processors may include: receiving, by a first device, a request from a first user; identifying, based on the request from the first user, (i) an action corresponding to the request and (ii) a first parameter corresponding to the action; determining that fulfillment of the action is to be delegated to a device other than the first device; in response to determining that fulfillment of the action is to be delegated to the device other than the first device: selecting, as the device other than the first device, a second device on which an application corresponding to the action is installed; identifying, by the first device, based on the first parameter corresponding to the action, and based on information associated with an account of the first user, a first disambiguated parameter corresponding to the action; and sending, to the second device, a command that specifies the action and the first disambiguated parameter corresponding to the action, to cause the second device to fulfill the action corresponding to the request from the first user, using the application installed on the second device.

In some implementations, determining that fulfillment of the action is to be delegated to the device other than the first device is based on determining that the application corresponding to the action is not installed on the first device.

In some implementations, selecting, as the device other than the first device, the second device on which the application corresponding to the action is installed, is based on the application corresponding to the action being in a logged-in state on the second device. In some implementations, selecting, as the device other than the first device, the second device on which an application corresponding to the action is installed, is further based on data that indicates that the second device is near the first user. In some implementations, determining that fulfillment of the action is to be delegated to the device other than the first device is based on: determining that the action and/or the first parameter requires the application corresponding to the action to be in a logged-in state; and determining that the application corresponding to the action is installed on the first device but is not in the logged-in state, or determining that the application corresponding to the action is not installed on the first device. In some implementations, the method further includes receiving, from the second device, prior to sending the command, an indication that the application corresponding to the action is in the logged-in state.

In some implementations, the method further includes determining, by the first device, an account of the first user based on contextual information. In some implementations, selecting, as the device other than the first device, the second device is based on the account of the first user. In some implementations, the request is included in an utterance, and determining the account of the first user includes determining that the utterance is spoken by the first user based on speaker-identification features of the utterance. In some implementations, the request is included in an utterance spoken by a person, and determining the account of the first user includes: receiving, from a camera of the first device, an image of the person, and determining that the utterance is spoken by the first user based on the image.

In some implementations, the method further includes determining, by the first device, that the first user is authorized to utilize the second device to perform the action corresponding to the request, the second device being associated with an account of a second user. In some implementations, selecting, as the device other than the first device, the second device is based on determining that the first user is authorized to utilize the second device to perform the action.

In some implementations, the method further includes identifying, based on the request from the first user, a second parameter corresponding to the action. In some implementations, the command that is sent to the second device further specifies the second parameter corresponding to the action; the second device identifies, based on the second parameter corresponding to the action, and based on information accessible to the second device, a second disambiguated parameter corresponding to the action; and the second device utilizes the first disambiguated parameter and the second disambiguated parameter to fulfill the action corresponding to the request from the first user.

In some additional or alternative implementations, a computer program product may include one or more computer-readable storage media having program instructions collectively stored on the one or more computer-readable storage media. The program instructions may be executable to: receive, by a first device, a request from a first user; identify, based on the request from the first user, an action corresponding to the request, and a first parameter corresponding to the action; determine that fulfillment of the action is to be delegated to a device other than the first device; in response to determining that fulfillment of the action is to be delegated to the device other than the first device: select, as the device other than the first device, a virtual copy of a second device, the second device having installed an application corresponding to the action; send, to the virtual copy of the second device, a command that specifies the action and the first parameter corresponding to the action, to cause the virtual copy of the second device to fulfill the action corresponding to the request from the first user, using the application installed on the virtual copy of the second device; and synchronize (i) the virtual copy of the second device and (ii) the second device.

In some implementations, selecting, as the device other than the first device, the virtual copy of the second device, is based on the application corresponding to the action being in a logged-in state on the virtual copy of the second device. In some implementations, selecting, as the device other than the first device, the virtual copy of the second device, is further based on data that indicates that the second device is near the first user. In some implementations, the program instructions are further executable to receive, from the virtual copy of the second device, prior to sending the command, an indication that the application corresponding to the action is in the logged-in state.

In some implementations, the program instructions are further executable to determine, by the first device, an account of the first user based on contextual information. In some implementations, selecting, as the device other than the first device, the virtual copy of the second device is based on the account of the first user.

In some additional or alternative implementations, a system may include a processor, a computer-readable memory, one or more computer-readable storage media, and program instructions collectively stored on the one or more computer-readable storage media. The program instructions may be executable to: receive, by a first device, a request from a first user; identify, based on the request from the first user, (i) an action corresponding to the request and (ii) a first parameter corresponding to the action; determine that fulfillment of the action is to be delegated to a device other than the first device; in response to determining that fulfillment of the action is to be delegated to the device other than the first device: select, as the device other than the first device, a second device on which an application corresponding to the action is installed; identify, by the first device, based on the first parameter corresponding to the action, and based on information associated with an account of the first user, a first disambiguated parameter corresponding to the action; and send, to the second device, a command that specifies the action and the first disambiguated parameter corresponding to the action, to cause the second device to fulfill the action corresponding to the request from the first user, using the application installed on the second device.

Through utilization of one or more techniques described herein, overall processing costs across multiple automated assistant client devices in an environment may be reduced, and overall memory and processing resources across the multiple automated assistant client devices may be more efficiently utilized. This may result in improved performance and an improved user experience across the multiple automated assistant client devices.

The above description is provided as an overview of some implementations of the present disclosure. Further description of those implementations, and other implementations, are described in more detail below.

Various implementations can include a non-transitory computer readable storage medium storing instructions executable by one or more processors (e.g., central processing unit(s) (CPU(s)), graphics processing unit(s) (GPU(s)), digital signal processor(s) (DSP(s)), and/or tensor processing unit(s) (TPU(s)) to perform a method such as one or more of the methods described herein. Other implementations can include an automated assistant client device (e.g., a client device including at least an automated assistant interface for interfacing with cloud-based automated assistant component(s)) that includes processor(s) operable to execute stored instructions to perform a method, such as one or more of the methods described herein. Yet other implementations can include a system of one or more servers that include one or more processors operable to execute stored instructions to perform a method such as one or more of the methods described herein.

DETAILED DESCRIPTION

Figure 1:
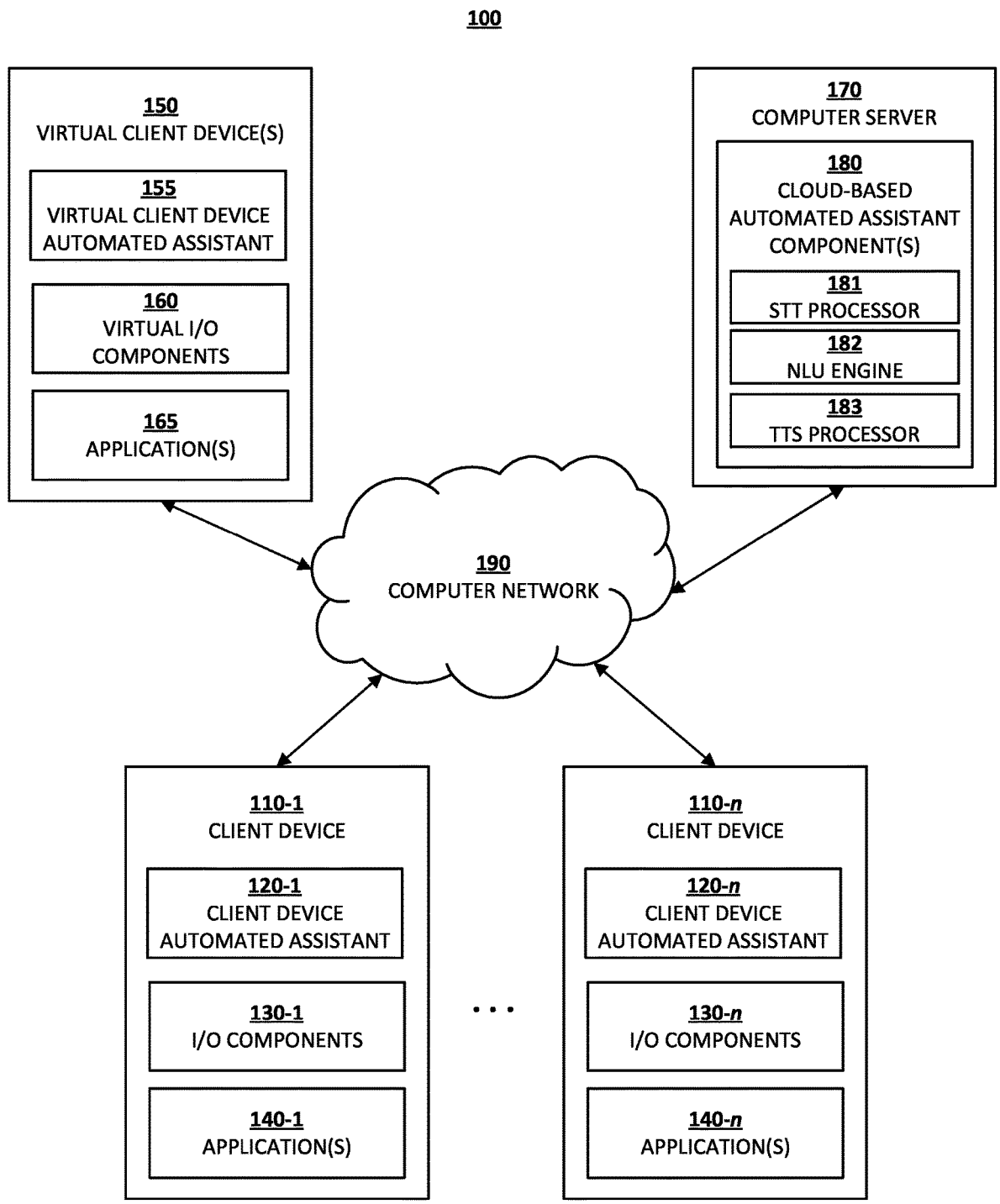
FIG. 1 schematically depicts an example environment in which selected aspects of the present disclosure may be implemented, in accordance with various implementations.

FIG. 1 schematically depicts an example environment 100 in which selected aspects of the present disclosure may be implemented, in accordance with various implementations. Any computing devices depicted in FIG. 1 or elsewhere in the figures may include logic such as one or more microprocessors (e.g., central processing units or "CPUs", graphical processing units or "GPUs") that execute computer-readable instructions stored in memory, or other types of logic such as application-specific integrated circuits ("ASIC"), field-programmable gate arrays ("FPGA"), and so forth. Some of the systems depicted in FIG. 1, such as virtual client device(s) 150 and computer server 170, may be implemented using one or more server computing devices that form what is sometimes referred to as a "cloud infrastructure," although this is not required.

In implementations, the environment 100 may include client devices 110-1, . . . , 110-n, each of which may be a mobile phone computing device, a laptop computing device, a desktop computing device, a tablet computing device, a standalone assistant-centric interactive speaker, a standalone assistant-centric interactive display with speaker(s), a smart appliance such as a smart television, and/or a wearable apparatus of a user that includes a computing device (e.g., a watch of the user having a computing device, glasses of the user having a computing device, a virtual or augmented reality computing device, etc.). Additional and/or alternative client devices 110-1, . . . , 110-n may be provided.

In implementations, each of the client devices 110-1, . . . , 110-n may include an instance of a client device automated assistant 120-1, . . . , 120-n. The client device automated assistant 120-1, . . . , 120-n can process user inputs received from input device(s) of I/O components 130-1, . . . , 130-n, such as spoken inputs detected via microphone(s) of I/O components 130-1, . . . , 130-n, touch inputs received via touch-screen displays of I/O components 130-1, . . . , 130-n, images detected via camera(s) of I/O components 130-1, . . . , 130-n, etc. Further, the client device automated assistant 120-1, . . . , 120-n can optionally render various outputs via output device(s) of I/O components 130-1, . . . , 130-n, such as speaker(s) and/or touch-screen displays of I/O components 130-1, . . . , 130-n.

In implementations, the client devices 110-1, . . . , 110-n may optionally include one or more application(s) 140-1, . . . , 140-n. Each of the application(s) 140-1, . . . , 140-n may be an application that provides functionality to perform one or more actions (e.g., sending messages from a user of the client device 110-1, . . . , 110-n to one or more other users using a messaging service, ordering a ride using a ride-hailing service, ordering food delivery using a food delivery service, etc.).

In implementations, the client devices 110-1, . . . , 110-n may be associated with different users. For example, the client devices 110-1, . . . , 110-n may include client device 110-1 which may be a standalone assistant-centric interactive display with speaker associated with a first user and which may not include any application(s) 140-1, client device 110-2 which may be a mobile phone computing device associated with the first user (e.g., a smartphone device of the first user) and which may include various installed application(s) 140-2 including a food delivery application, and client device 110-3 which may be a mobile phone computing device associated with a second user (e.g., a smartphone device of the second user) and which may include various installed application(s) 140-3 including a ride-hailing application. Additional and/or alternative client devices 110-1, . . . , 110-n associated with various users and having various application(s) 140-1, . . . , 140-n installed thereon may be provided.

In implementations, the environment 100 may include one or more virtual client device(s) 150, which may be one or more nodes in a cloud infrastructure (cloud computing environment). Each virtual client device 150 may be a virtual machine instance that includes or utilizes an image of a client device (e.g., a virtual machine image). For example, virtual client device 150 may be a virtual machine instance that utilizes an image of one of the client devices 110-1, . . . , 110-n. Virtual client device 150 may be able to perform some or all of the functions of a corresponding client device (e.g., one of the client devices 110-1, . . . , 110-n).

In implementations, virtual client device 150 may include an instance of a virtual client device automated assistant 155. The virtual client device automated assistant 155 can process virtual (e.g., simulated) user inputs received from virtual input device(s) of virtual I/O components 160, such as virtual spoken inputs detected via virtual microphone(s) of virtual I/O components 160, virtual touch inputs received via virtual touch-screen displays of virtual I/O components 160, virtual images detected via virtual camera(s) of virtual I/O components 160, etc. Further, the virtual client device 150 can optionally render various outputs via virtual output device(s) of virtual I/O components 160, such as virtual speaker(s) and/or virtual touch-screen displays of virtual I/O components 160.

In implementations, the virtual client device(s) 150 may optionally include one or more application(s) 165. Each of the application(s) 165 may be an application that provides functionality to perform one or more actions (e.g., sending messages from a user of the virtual client device(s) 150 to one or more other users using a messaging service, ordering a ride using a ride-hailing service, ordering food delivery using a food delivery service, etc.).

In implementations, the environment 100 may include a computer server 170, which may be a node in a cloud infrastructure (cloud computing environment). The computer server 170 may include cloud-based automated assistant component(s) 180. In various implementations, one or more instances of the client device automated assistants 120-1, . . . , 120-*n* of the client devices 110-1, . . . , 110-*n* and/or one or more instances of the virtual client device automated assistant 155 of the virtual client device(s) 150 can interface with the cloud-based automated assistant component(s) 180 in processing inputs and/or in generating outputs based on the inputs and/or in generating commands based on the inputs.

For example, one of the client device automated assistants 120-1, . . . , 120-*n* of one of the client devices 110-1, . . . , 110-*n* and/or the virtual client device automated assistant 155 of the virtual client device(s) 150 can transmit, to the cloud-based automated assistant component(s) 180, audio data corresponding to spoken input received after invocation of one of the client device automated assistants 120-1, . . . , 120-*n* of one of the client devices 110-1, . . . , 110-*n* and/or the virtual client device automated assistant 155 of the virtual client device(s) 150. The invocation of one of the client device automated assistants 120-1, . . . , 120-*n* of one of the client devices 110-1, . . . , 110-*n* can be based on detecting an invocation phrase (e.g., "OK Assistant" or another hotword), interaction of a hardware button or graphical button that invokes the client device automated assistant 120-1, . . . , 120-*n*, in response to a gesture detected via a camera of the I/O components 130-1, . . . , 130-*n*, and/or other invocation signal(s). The cloud-based automated assistant component(s) 180 can convert the audio data to text using speech-to-text (STT) processor 181, and perform natural language understanding (NLU) on the text using NLU engine 182 to determine an appropriate response. For example, the appropriate response can be a textual response that can optionally be converted to generated speech using text-to-speech (TTS) processor 183, and transmitted to the client device automated assistant 120-1, . . . , 120-*n* for rendering of the generated speech via speaker(s) of the I/O components 130-1, . . . , 130-*n*.

In implementations, the client devices 110-1, . . . , 110-*n*, the virtual client device(s) 150, and the computer server 170 may be communicatively coupled via one or more wide area networks (e.g., the Internet), indicated generally by computer network 190 of FIG. 1. It is noted that the client devices 110-1, . . . , 110-*n*, the virtual client device(s) 150, and the computer server 170 can utilize one or more local area networks in accessing the computer network 190 and/or in locally communicating with one another. Such local area networks can include a Wi-Fi network and/or a mesh network.

Figure 2:
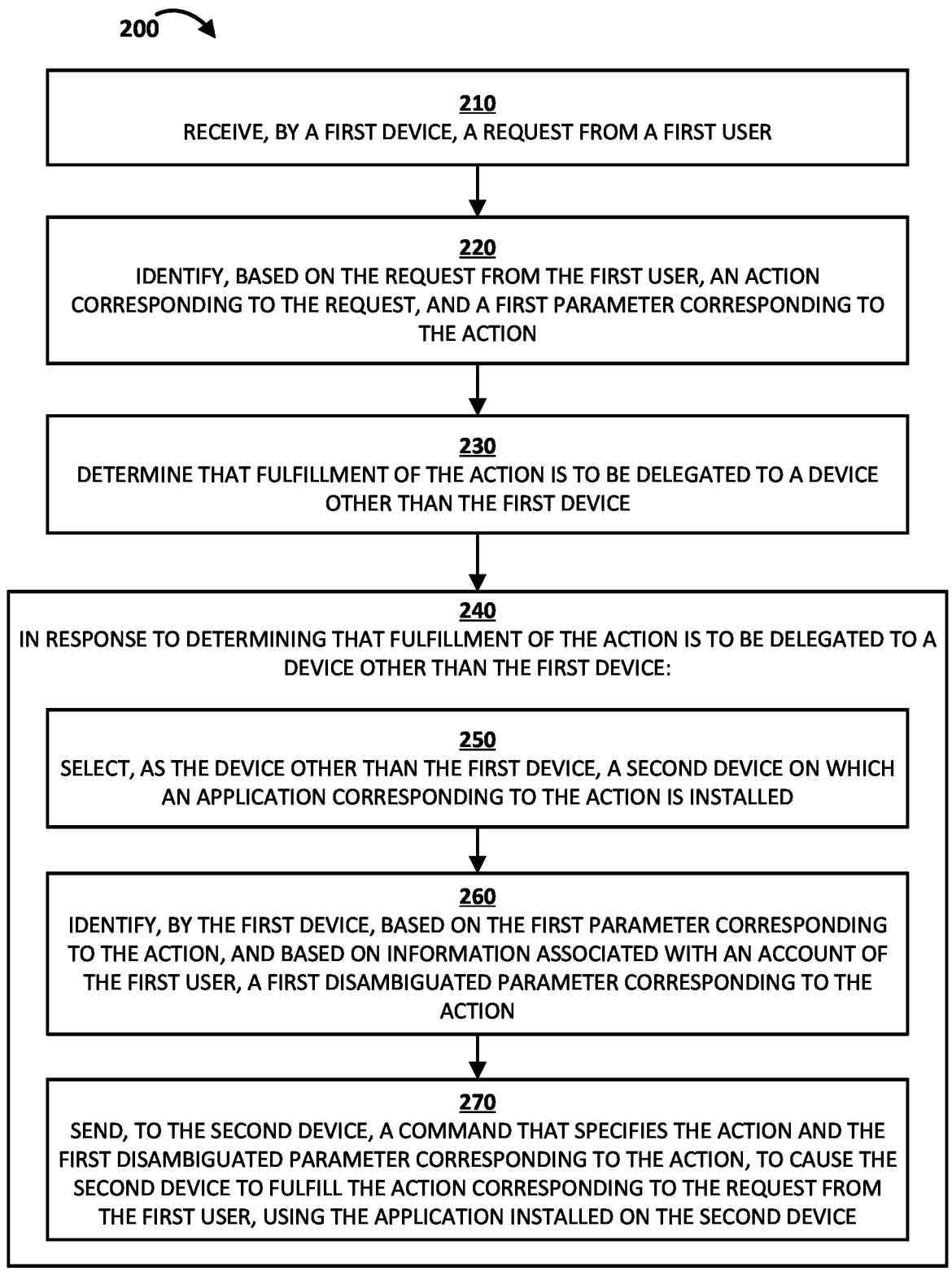
FIG. 2 depicts a flowchart illustrating an example method for practicing selected aspects of the present disclosure.

FIG. 2 is a flowchart illustrating an example method 200 of delegation of request fulfillment, by an assistant, to other devices, in accordance with implementations disclosed herein. For convenience, the operations of the flowchart are described with reference to a system that performs the operations. This system may include various components of various computer systems, such as one or more components of the client devices 110-1, . . . , 110-*n*, the virtual client device(s) 150, and/or the computer server 170. Moreover, while operations of method 200 are shown in a particular order, this is not meant to be limiting. One or more operations may be reordered, omitted, or added.

At block 210, the system may receive, by a first device, a request from a first user. In implementations, at block 210, a client device automated assistant 120-1, . . . , 120-*n* of one of the client devices 110-1, . . . , 110-*n* (i.e., the first device) and/or the cloud-based automated assistant component(s) 180 of the computer server 170 may receive a request from a first user. For example, the request may be a request to send a message, a request to order a ride, a request to order food, etc. The request may be in the form of a spoken utterance received via the I/O components 130-1, . . . , 130-*n* (e.g., via a microphone) of the client device 110-1, . . . , 110-*n*.

Still referring to block 210, in implementations, the client device automated assistant 120-1, . . . , 120-*n* of the client device 110-1, . . . , 110-*n* may be invoked based on the client device automated assistant 120-1, . . . , 120-*n* detecting an invocation phrase (e.g., "OK Assistant"), interaction of a hardware button or graphical button that invokes the client device automated assistant 120-1, . . . , 120-*n*, in response to a gesture detected via a camera of the I/O components 130-1, . . . , 130-*n*, and/or other invocation signal(s). In implementations, after the client device automated assistant 120-1, . . . , 120-*n* is invoked, the client device automated assistant 120-1, . . . , 120-*n* may process audio data received by a microphone of the I/O components 130-1, . . . , 130-*n* of the client device 110-1, . . . , 110-*n* (e.g., a spoken utterance following the invocation phrase) to identify, in the audio data, a request from the first user.

Still referring to block 210, in implementations, the client device automated assistant 120-1, . . . , 120-*n* of the client device 110-1, . . . , 110-*n* may convert, to text, the audio data corresponding to spoken input received after invocation of the client device automated assistant 120-1, . . . , 120-*n*, and perform NLU on the text to identify the request from the first user that is included in the audio data. In other implementations, the client device automated assistant 120-1, . . . , 120-*n* of the client device 110-1, . . . , 110-*n* may transmit, to the cloud-based automated assistant component(s) 180 of the computer server 170, the audio data corresponding to spoken input received after invocation of client device automated assistant 120-1, . . . , 120-*n* at the client device 110-1, . . . , 110-*n*. The cloud-based automated assistant component(s) 180 may then convert the audio data to text using the STT processor 181, and perform NLU on the text using the NLU engine 182 to identify the request from the first user.

Still referring to FIG. 2, at block 220, the system may identify, based on the request from the first user, an action corresponding to the request, and a first parameter corresponding to the action. In implementations, at block 220, the client device automated assistant 120-1, . . . , 120-*n* of one of the client devices 110-1, . . . , 110-*n* (i.e., the first device) and/or the cloud-based automated assistant component(s) 180 may identify, based on the request from the first user received at block 210, an action corresponding to the request, and a first parameter corresponding to the action.

In some implementations, at block 220, the system may also identify, based on the request from the first user, a second parameter corresponding to the action. In implementations, the client device automated assistant 120-1, . . . , 120-*n* of one of the client devices 110-1, . . . , 110-*n* (i.e., the first device) and/or the cloud-based automated assistant component(s) 180 may identify, based on the request from the first user received at block 210, a second parameter corresponding to the action.

In a first example, the request that is received by the client device automated assistant 120-1, . . . , 120-*n* and/or the cloud-based automated assistant component(s) 180 may be, "Send a message to my spouse with showtimes for that movie". The client device automated assistant 120-1, . . . , 120-*n* of one of the client devices 110-1, . . . , 110-*n* (i.e., the first device) and/or the cloud-based automated assistant component(s) 180 may perform NLU to identify "send a message" as the action, "showtimes for that movie" as a first parameter, and "my spouse" as a second parameter. In a second example, the request that is received by the client device automated assistant 120-1, . . . , 120-$n$ and/or the cloud-based automated assistant component(s) 180 may be, "Order takeout. I would like my favorite meal from that restaurant". The client device automated assistant 120-1, . . . , 120-$n$ of one of the client devices 110-1, . . . , 110-$n$ (i.e., the first device) and/or the cloud-based automated assistant component(s) 180 may perform NLU to identify "order takeout" as the action, "that restaurant" as the first parameter, and "my favorite meal" as the second parameter.

Still referring to FIG. 2, at block 230, the system may determine that fulfillment of the action is to be delegated to a device other than the first device. In implementations, the client device automated assistant 120-1, . . . , 120-$n$ of one of the client devices 110-1, . . . , 110-$n$ (i.e., the first device) and/or the cloud-based automated assistant component(s) 180 may determine that fulfillment of the action identified at block 220 is to be delegated to a device other than the first device.

Still referring to block 230, in some implementations, determining that fulfillment of the action is to be delegated to the device other than the first device is based on determining that the application corresponding to the action is not installed on the first device.

Still referring to block 230, in some implementations, determining that fulfillment of the action is to be delegated to the device other than the first device is based on: determining that the action and/or the first parameter requires the application corresponding to the action to be in a logged-in state; and determining that the application corresponding to the action is installed on the first device but is not in the logged-in state, or determining that the application corresponding to the action is not installed on the first device.

Still referring to FIG. 2, at block 240, in response to determining that fulfillment of the action is to be delegated to the device other than the first device, the system may proceed to blocks 250 through 270. In implementations, in response to determining that fulfillment of the action is to be delegated to the device other than the first device, the client device automated assistant 120-1, . . . , 120-$n$ of one of the client devices 110-1, . . . , 110-$n$ (i.e., the first device) and/or the cloud-based automated assistant component(s) 180 may proceed to blocks 250 through 270.

At block 250, the system may select, as the device other than the first device, a second device on which an application corresponding to the action is installed. In implementations, the client device automated assistant 120-1, . . . , 120-$n$ of one of the client devices 110-1, . . . , 110-$n$ (i.e., the first device) and/or the cloud-based automated assistant component(s) 180 may select, as the device other than the first device, another of the client devices 110-1, . . . , 110-$n$ (i.e., the second device) on which an application corresponding to the action is installed.

Still referring to block 250, in some implementations, selecting, as the device other than the first device, the second device on which the application corresponding to the action is installed, is based on the application corresponding to the action being in a logged-in state on the second device. In some implementations, before receiving the request at block 210, the system may receive, from the second device, an indication that the application is installed and data indicating whether or not the application is in the logged-in state. In other implementations, after receiving the request at block 210, the system may query one or more devices, including the second device, to determine whether or not the application is installed and/or whether or not the application is in the logged-in state. In some implementations, by making a determination as to whether or not the application is in the logged-in state, prior to sending a command to the second device, the system may ensure that the second device is able to fulfill the request without requiring the first user to login, which can lead to a shortened duration of interaction and less utilization of resources at the second device.

In some implementations, the first device may fulfill, via the first device, requests that do not require an application to be in a logged-in state and/or that may be fulfilled via without the application, while the first device may delegate, to the second device, other requests that require the application to be in a logged-in state.

Still referring to block 250, in some implementations, selecting, as the device other than the first device, the second device on which an application corresponding to the action is installed, is further based on data that indicates that the second device is near the first user.

In an example, both the second device and a third device (i.e., yet another of the client devices 110-1, . . . , 110-$n$) may have the application corresponding to the action installed and in a logged-in state. However, the system may select, as the device other than the first device, the second device, on the basis of the second device being positioned near the first user and the third device not being positioned near the first user. In some implementations, the system may determine that the second device is positioned near the first user based on the second device having been recently interacted with, based on sensor(s) (e.g., accelerometer data and/or light sensor data) of the second device indicating that the second device is being held or in a pocket, and/or based on the second device detecting a hotword that preceded the request (and the third device either not detecting the hotword or detecting the hotword at a lower volume).

Still referring to block 250, in some implementations, the system determines, by the first device, an account of the first user based on contextual information. In some implementations, selecting, as the device other than the first device, the second device may be based on the account of the first user. In some implementations, the request received at block 210 may be included in an utterance, and determining the account of the first user includes determining that the utterance is spoken by the first user based on speaker-identification features of the utterance. In other implementations, the request may be included in an utterance spoken by a person, and determining the account of the first user may include receiving, from a camera of the first device, an image of the person, and determining that the utterance is spoken by the first user based on the image.

Still referring to block 250, in some implementations, the system may determine, by the first device, that the first user is authorized to utilize the second device to perform the action corresponding to the request, the second device being associated with an account of a second user. In some implementations, selecting, as the device other than the first device, the second device may be based on determining that the first user is authorized to utilize the second device to perform the action. For example, the first user may be a child, and the child may be authorized to utilize a second device associated with an account of a parent to perform a first action. In this example, the child may not be authorized to utilize the second device associated with the account of the parent to perform a second action.

Still referring to FIG. 2, at block 260, the system may identify, by the first device, based on the first parameter corresponding to the action, and based on information associated with an account of the first user, a first disambiguated parameter corresponding to the action. In implementations, the client device automated assistant 120-1, . . . , 120-*n* of one of the client devices 110-1, . . . , 110-*n* (i.e., the first device) and/or the cloud-based automated assistant component(s) 180 may identify, based on the first parameter corresponding to the action identified at block 220, and based on information associated with an account of the first user, a first disambiguated parameter corresponding to the action.

Still referring to block 260, in the first example discussed above, the client device automated assistant 120-1, . . . , 120-*n* may identify the first disambiguated parameter, "showtimes for Movie X" based on the first parameter "showtimes for that movie" and information associated with an account of the first user indicating that the first user most recently requested "reviews for Movie X", e.g., in a request received by the first device. In the second example discussed above, the client device automated assistant 120-1, . . . , 120-*n* may identify the first disambiguated parameter, "Restaurant Y" based on the first parameter "that restaurant" and information associated with an account of the first user indicating that the first user most recently asked "What time does Restaurant Y open", e.g., in a request received by the first device. In some implementations, the client device automated assistant 120-1, . . . , 120-*n* of one of the client devices 110-1, . . . , 110-*n* (i.e., the first device) and/or the cloud-based automated assistant component(s) 180 may disambiguate the first parameter based on any information regarding the first user's preferences, previous requests, and/or any other information that is accessible to the client device automated assistant 120-1, . . . , 120-*n* of one of the client devices 110-1, . . . , 110-*n* (i.e., the first device) and/or the cloud-based automated assistant component(s) 180.

In another example, in which the request is "Order a ride, pickup location here", the client device automated assistant 120-1, . . . , 120-*n* of one of the client devices 110-1, . . . , 110-*n* (i.e., the first device) and/or the cloud-based automated assistant component(s) 180 may disambiguate the first parameter ("pickup location here") based on a location of the first device. In this example, the second device to which the command is sent to cause the second device to fulfill the action corresponding to the request from the first user may be located at a location different from that of the first device. Accordingly, the "pickup location here" parameter is disambiguated by the first device, prior to sending the command to the second device, to ensure that the pickup location used in fulfilling the "order a ride" action corresponds to the pickup location expected by the first user (i.e., to ensure that the pickup location is the location of the first device, and not the location of the second device).

Still referring to FIG. 2, at block 270, the system may send, to the second device, a command that specifies the action and the first disambiguated parameter corresponding to the action, to cause the second device to fulfill the action corresponding to the request from the first user, using the application installed on the second device. In implementations, the client device automated assistant 120-1, . . . , 120-*n* of one of the client devices 110-1, . . . , 110-*n* (i.e., the first device) and/or the cloud-based automated assistant component(s) 180 may send, to the second device selected at block 250, a command that specifies the action identified at block 220 and the first disambiguated parameter corresponding to the action identified at block 260, to cause the second device to fulfill the action corresponding to the request from the first user, using the application installed on the second device.

In some implementations, the system receives, from the second device, prior to sending the command, an indication that the application corresponding to the action is in the logged-in state.

Still referring to block 270, in implementations, if the command does not specify an application to use to perform the action, the client device automated assistant 120-1, . . . , 120-*n* of the second device may determine the application using preconfigured rules (e.g., use the messaging application most recently specified by the first user with respect to any message recipient, or use the messaging application most recently specified by the first user with respect to Person Z, etc.). In some implementations, the client device automated assistant 120-1, . . . , 120-*n* of the second device may determine the application based on information on the second device indicating which application the user uses (e.g., most frequently, or most recently) to perform a particular action (e.g., order food).

In some implementations, the client device automated assistant 120-1, . . . , 120-*n* of the second device may determine the application based on information on the second device and based on one or more parameters. For example, for a "send message" action, the client device automated assistant 120-1, . . . , 120-*n* of the second device may determine the application based on a parameter indicating a particular person to whom a message is to be sent, and information on the second device indicating an application that the first user has used to send messages to the particular person.

In some implementations, the client device automated assistant 120-1, . . . , 120-*n* of the second device may determine additional parameters to be used in performing the action, based on information on the second device. For example, internal application indexing information may indicate a favorite restaurant of the first user, and this information may be used to identify a restaurant to use to perform an "order food" action.

Still referring to block 270, in some implementations, the command that is sent to the second device may further specify the second parameter corresponding to the action, identified at block 220. In some implementations, the second device may identify, based on the second parameter corresponding to the action, and based on information accessible to the second device, a second disambiguated parameter corresponding to the action. In some implementations, the second device may utilize the first disambiguated parameter and the second disambiguated parameter to fulfill the action corresponding to the request from the first user.

In the first example discussed above, the command that is sent to the second device may further specify the second parameter, "my spouse". An automated assistant running on the second device (e.g., another of the client device automated assistants 120-1, . . . , 120-*n* running on another of the client devices 110-1, . . . , 110-*n*) may identify the second disambiguated parameter, "Person Z" based on the second parameter "my spouse" and information accessible to the second device. The automated assistant running on the second device may then utilize the first disambiguated parameter, "showtimes for Movie X", and the second disambiguated parameter, "Person Z", to fulfill the request received at block 210, by causing an application installed on the second device to send a message to Person Z with showtimes for Movie X.

In the second example discussed above, the command that is send to the second device may further specify the second parameter, "my favorite meal". An automated assistant running on the second device (e.g., another of the client device automated assistants 120-1, . . . , 120-*n* running on another of the client devices 110-1, . . . , 110-*n*) may identify the second disambiguated parameter, "Meal XYZ" based on the second parameter "my favorite meal" and information accessible to the second device. For example, the automated assistant running on the second device may query a food delivery application installed on the second device to disambiguate "my favorite meal". The automated assistant running on the second device may then utilize the first disambiguated parameter, "Restaurant Y", and the second disambiguated parameter, "Meal XYZ", to fulfill the request received at block 210, by causing an application installed on the second device to order takeout, including Meal XYZ from Restaurant Y.

In some implementations, a fulfillment status or result of the command may be sent from the second device back to the first device, and the first device may provide the fulfillment status, the result of the command, or another response based on the fulfillment status and/or the result of the command, to the first user. For example, the first device may output an audio or visual indication that the action was performed (e.g., by announcing "Message with showtimes for Movie X sent to Person Z", or by announcing "Meal XYZ ordered from Restaurant Y for takeout"), e.g., using a speaker or display of the I/O components of I/O components 130-1, . . . , 130-*n*.

Figure 3:
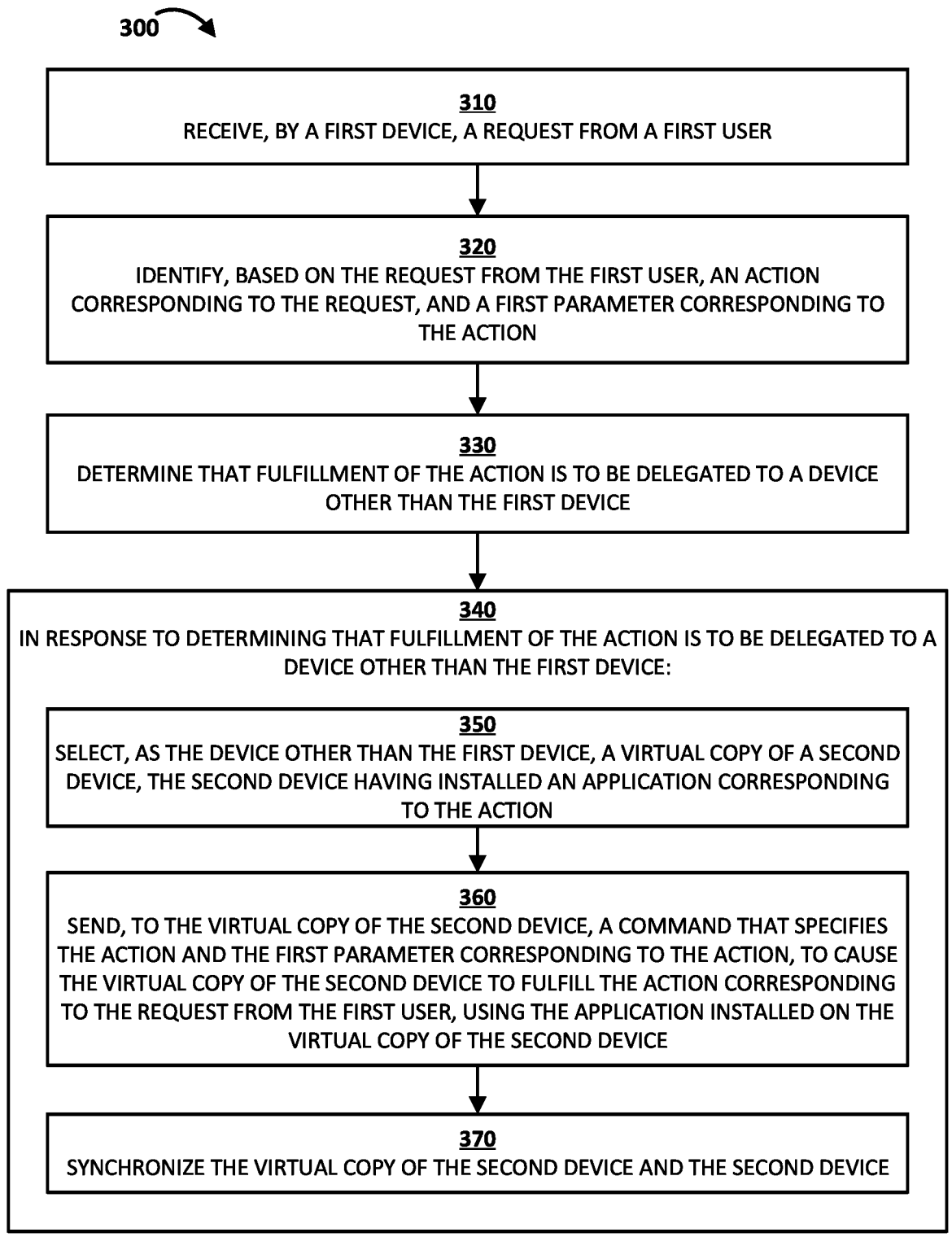
FIG. 3 depicts another flowchart illustrating an example method for practicing selected aspects of the present disclosure.

FIG. 3 is a flowchart illustrating an example method 300 of delegation of request fulfillment, by an assistant, to other devices, in accordance with implementations disclosed herein. For convenience, the operations of the flowchart are described with reference to a system that performs the operations. This system may include various components of various computer systems, such as one or more components of the client devices 110-1, . . . , 110-*n*, the virtual client device(s) 150, and/or the computer server 170. Moreover, while operations of method 300 are shown in a particular order, this is not meant to be limiting. One or more operations may be reordered, omitted, or added.

At block 310, the system may receive, by a first device, a request from a first user. In implementations, at block 310, a client device automated assistant 120-1, . . . , 120-*n* of one of the client devices 110-1, . . . , 110-*n* (i.e., the first device) and/or the cloud-based automated assistant component(s) 180 of the computer server 170 may receive a request from a first user. For example, the request may be a request to send a message, a request to order a ride, a request to order food, etc. The request may be in the form of a spoken utterance received via the I/O components 130-1, . . . , 130-*n* (e.g., via a microphone) of the client device 110-1, . . . , 110-*n*.

Still referring to block 310, in implementations, the client device automated assistant 120-1, . . . , 120-*n* of the client device 110-1, . . . , 110-*n* may be invoked based on the client device automated assistant 120-1, . . . , 120-*n* detecting an invocation phrase (e.g., "OK Assistant"), interaction of a hardware button or graphical button that invokes the client device automated assistant 120-1, . . . , 120-*n*, in response to a gesture detected via a camera of the I/O components 130-1, . . . , 130-*n*, and/or other invocation signal(s). In implementations, after the client device automated assistant 120-1, . . . , 120-*n* is invoked, the client device automated assistant 120-1, . . . , 120-*n* may process audio data received by a microphone of the I/O components 130-1, . . . , 130-*n* of the client device 110-1, . . . , 110-*n* (e.g., a spoken utterance following the invocation phrase) to identify, in the audio data, a request from the first user.

Still referring to block 310, in implementations, the client device automated assistant 120-1, . . . , 120-*n* of the client device 110-1, . . . , 110-*n* may convert, to text, the audio data corresponding to spoken input received after invocation of the client device automated assistant 120-1, . . . , 120-*n*, and perform NLU on the text to identify the request from the first user that is included in the audio data. In other implementations, the client device automated assistant 120-1, . . . , 120-*n* of the client device 110-1, . . . , 110-*n* may transmit, to the cloud-based automated assistant component(s) 180 of the computer server 170, the audio data corresponding to spoken input received after invocation of client device automated assistant 120-1, . . . , 120-*n* at the client device 110-1, . . . , 110-*n*. The cloud-based automated assistant component(s) 180 may then convert the audio data to text using the STT processor 181, and perform NLU on the text using the NLU engine 182 to identify the request from the first user.

Still referring to FIG. 3, at block 320, the system may identify, based on the request from the first user, an action corresponding to the request, and a first parameter corresponding to the action. In implementations, at block 320, the client device automated assistant 120-1, . . . , 120-*n* of one of the client devices 110-1, . . . , 110-*n* (i.e., the first device) and/or the cloud-based automated assistant component(s) 180 may identify, based on the request from the first user received at block 310, an action corresponding to the request and a first parameter corresponding to the action.

In some implementations, at block 320, the system may also identify, based on the request from the first user, a second parameter corresponding to the action. In implementations, the client device automated assistant 120-1, . . . , 120-*n* of one of the client devices 110-1, . . . , 110-*n* (i.e., the first device) and/or the cloud-based automated assistant component(s) 180 may identify, based on the request from the first user received at block 310, a second parameter corresponding to the action.

In a first example, the request that is received by the client device automated assistant 120-1, . . . , 120-*n* and/or the cloud-based automated assistant component(s) 180 may be, "Send a message to my spouse with showtimes for that movie". The client device automated assistant 120-1, . . . , 120-*n* of one of the client devices 110-1, . . . , 110-*n* (i.e., the first device) and/or the cloud-based automated assistant component(s) 180 may perform NLU to identify "send a message" as the action, "showtimes for that movie" as a first parameter, and "my spouse" as a second parameter. In a second example, the request that is received by the client device automated assistant 120-1, . . . , 120-*n* and/or the cloud-based automated assistant component(s) 180 may be, "Order takeout. I would like my favorite meal from that restaurant".

The client device automated assistant 120-1, . . . , 120-*n* of one of the client devices 110-1, . . . , 110-*n* (i.e., the first device) and/or the cloud-based automated assistant component(s) 180 may perform NLU to identify "order takeout" as the action, "that restaurant" as the first parameter, and "my favorite meal" as the second parameter.

Still referring to FIG. 3, at block 330, the system may determine that fulfillment of the action is to be delegated to a device other than the first device. In implementations, the client device automated assistant 120-1, . . . , 120-*n* of one of the client devices 110-1, . . . , 110-*n* (i.e., the first device) and/or the cloud-based automated assistant component(s) 180 may determine that fulfillment of the action identified at block 320 is to be delegated to a device other than the first device.

Still referring to block 330, in some implementations, determining that fulfillment of the action is to be delegated to the device other than the first device is based on determining that the application corresponding to the action is not installed on the first device.

Still referring to block 330, in some implementations, determining that fulfillment of the action is to be delegated to the device other than the first device is based on: determining that the action and/or the first parameter requires the application corresponding to the action to be in a logged-in state; and determining that the application corresponding to the action is installed on the first device but is not in the logged-in state, or determining that the application corresponding to the action is not installed on the first device.

Still referring to FIG. 3, at block 340, in response to determining that fulfillment of the action is to be delegated to the device other than the first device, the system may proceed to blocks 350 through 370. In implementations, in response to determining that fulfillment of the action is to be delegated to the device other than the first device, the client device automated assistant 120-1, . . . , 120-*n* of one of the client devices 110-1, . . . , 110-*n* (i.e., the first device) and/or the cloud-based automated assistant component(s) 180 may proceed to blocks 350 through 370.

At block 350, the system may select, as the device other than the first device, a virtual copy of a second device, the second device having installed an application corresponding to the action. In implementations, the client device automated assistant 120-1, . . . , 120-*n* of one of the client devices 110-1, . . . , 110-*n* (i.e., the first device) and/or the cloud-based automated assistant component(s) 180 may select, as the device other than the first device, one of the virtual client device(s) 150, which may be a virtual copy of another of the client devices 110-1, . . . , 110-*n* (i.e., the second device) on which an application corresponding to the action is installed.

Still referring to block 350, in some implementations, selecting, as the device other than the first device, the virtual copy of the second device, is based on the application corresponding to the action being in a logged-in state on the virtual copy of the second device. In some implementations, before receiving the request at block 310, the system may receive, from the second device (and/or from the virtual copy of second device), an indication that the application is installed and data indicating whether or not the application is in the logged-in state. In other implementations, after receiving the request at block 310, the system may query one or more devices, including the second device (i.e., another of the client devices 110-1, . . . , 110-*n*) and/or the virtual client device(s) 150 (which may include a virtual copy of the second device), to determine whether or not the application is installed and/or whether or not the application is in the logged-in state. In some implementations, by making a determination as to whether or not the application is in the logged-in state, prior to sending a command to the virtual copy of the second device, the system may ensure that the virtual copy of the second device is able to fulfill the request without requiring the first user to login, which can lead to a shortened duration of interaction and less utilization of resources.

In some implementations, the first device may fulfill, via the first device, requests that do not require an application to be in a logged-in state and/or that may be fulfilled via without the application, while the first device may delegate, to the virtual copy of the second device, other requests that require the application to be in a logged-in state.

Still referring to block 350, in some implementations, selecting, as the device other than the first device, the virtual copy of the second device, is further based on data that indicates that the second device is near the first user.

In an example, both the second device and a third device (i.e., yet another of the client devices 110-1, . . . , 110-*n*) may have the application corresponding to the action installed and in a logged-in state. However, the system may select, as the device other than the first device, the virtual copy of the second device, on the basis of the second device being positioned near the first user and the third device not being positioned near the first user. In some implementations, the system may determine that the second device is positioned near the first user based on the second device having been recently interacted with, based on sensor(s) (e.g., accelerometer data and/or light sensor data) of the second device indicating that the second device is being held or in a pocket, and/or based on the second device detecting a hotword that preceded the request (and the third device either not detecting the hotword or detecting the hotword at a lower volume).

Still referring to block 350, in some implementations, the system determines, by the first device, an account of the first user based on contextual information. In some implementations, selecting, as the device other than the first device, the virtual copy of the second device may be based on the account of the first user. In some implementations, the request received at block 310 may be included in an utterance, and determining the account of the first user includes determining that the utterance is spoken by the first user based on speaker-identification features of the utterance. In other implementations, the request may be included in an utterance spoken by a person, and determining the account of the first user may include receiving, from a camera of the first device, an image of the person, and determining that the utterance is spoken by the first user based on the image.

Still referring to block 350, in some implementations, the system may determine, by the first device, that the first user is authorized to utilize the second device to perform the action corresponding to the request, the second device being associated with an account of a second user. In some implementations, selecting, as the device other than the first device, the virtual copy of the second device may be based on determining that the first user is authorized to utilize the second device to perform the action.

Still referring to FIG. 3, at block 360, the system may send, to the virtual copy of the second device, a command that specifies the action and the first parameter corresponding to the action, to cause the virtual copy of the second device to fulfill the action corresponding to the request from the first user, using the application installed on the virtual copy of the second device. In implementations, the client device automated assistant 120-1, . . . , 120-*n* of one of the client devices 110-1, . . . , 110-*n* (i.e., the first device) and/or the cloud-based automated assistant component(s) 180 may send, to the virtual client device(s) 150 (which may include the virtual copy of the second device selected at block 350), a command that specifies the action and the first parameter identified at block 320, to cause the virtual copy of the second device to fulfill the action corresponding to the request from the first user, using the application installed on the virtual copy of the second device.

In some implementations, the system receives, from the second device, prior to sending the command, an indication that the application corresponding to the action is in the logged-in state.

Still referring to block 360, in implementations, if the command does not specify an application to use to perform the action, the virtual client device automated assistant 155 of the virtual client device 150 may determine the application using preconfigured rules (e.g., use the messaging application most recently specified by the first user with respect to any message recipient, or use the messaging application most recently specified by the first user with respect to Person Z, etc.). In some implementations, the virtual client device automated assistant 155 of the virtual client device 150 may determine the application based on information on the virtual client device 150 indicating which application the user uses (e.g., most frequently, or most recently) to perform a particular action (e.g., order food).

In some implementations, the virtual client device automated assistant 155 of the virtual client device 150 may determine the application based on information on the virtual client device 150 and based on one or more parameters. For example, for a "send message" action, the virtual client device automated assistant 155 of the virtual client device 150 may determine the application based on a parameter indicating a particular person to whom a message is to be sent, and information on the virtual client device 150 indicating an application that the first user has used to send messages to the particular person.

In some implementations, the virtual client device automated assistant 155 of the virtual client device 150 may determine additional parameters to be used in performing the action, based on information on the virtual client device 150. For example, internal application indexing information may indicate a favorite restaurant of the first user, and this information may be used to identify a restaurant to use to perform an "order food" action.

Still referring to block 360, in some implementations, the command that is sent to the virtual client device 150 may further specify the second parameter corresponding to the action, identified at block 320. In some implementations, the virtual client device 150 may identify, based on the second parameter corresponding to the action, and based on information accessible to the virtual client device 150, a second disambiguated parameter corresponding to the action. In some implementations, the virtual client device 150 may utilize the first parameter and the second disambiguated parameter to fulfill the action corresponding to the request from the first user.

In some implementations, prior to sending the command to the virtual client device 150 at block 360, the system may disambiguate the first parameter that is specified in the command. For example, based on the first parameter corresponding to the action, and based on information associated with an account of the first user, the first device may identify a first disambiguated parameter corresponding to the action. In implementations, the client device automated assistant 120-1, ..., 120-n of one of the client devices 110-1, ..., 110-n (i.e., the first device) and/or the cloud-based automated assistant component(s) 180 may identify, based on the first parameter corresponding to the action, and based on information associated with an account of the first user, a first disambiguated parameter corresponding to the action, and the first disambiguated parameter may be specified in the command, in place of the first parameter.

Still referring to FIG. 3, at block 370, the system may synchronize the virtual copy of the second device and the second device. In implementations, the client device automated assistant 120-1, ..., 120-n of one of the client devices 110-1, ..., 110-n (i.e., the first device), the cloud-based automated assistant component(s) 180, and/or the virtual client device 150 may cause the virtual client device 150 (which may include the virtual copy of the second device) to be synchronized with the second device. For example, any updates to the state of the virtual client device 150, any updates to the state of applications installed on the virtual client device 150, and/or any updates to data stored on the virtual client device, etc., e.g., as a consequence of the command sent at block 360 causing the virtual client device 150 to fulfill the action corresponding to the request from the first user, using the application installed on the virtual client device 150, may be synchronized with the second device, to cause the updates to be propagated to the second device. Additionally, in some implementations, the synchronization may be a two-way synchronization, such that any updates to the second client device (e.g., updates to the state of the second client device, updates to the applications installed on the second client device, updates to the state of applications installed on the second client device, and/or updates to data stored on the second client device, etc.) are also propagated to the virtual client device 150. In some implementations, synchronization may also be initiated at other times to ensure that the virtual client device 150 remains in sync with the second client device.

In other implementations, the system may provide for retrieval of information from a target device, without taking any action on the target device. For example, a user may say, "What are the promotions for me on Delivery App X", and the system may identify another device of the user having a logged-in account on Delivery App X. The system may send a command to that device, causing the application to open to a promotions page in the application. The system may then retrieve information about promotions from the promotions page and then send it back to a device that received the user request.

Figure 4:
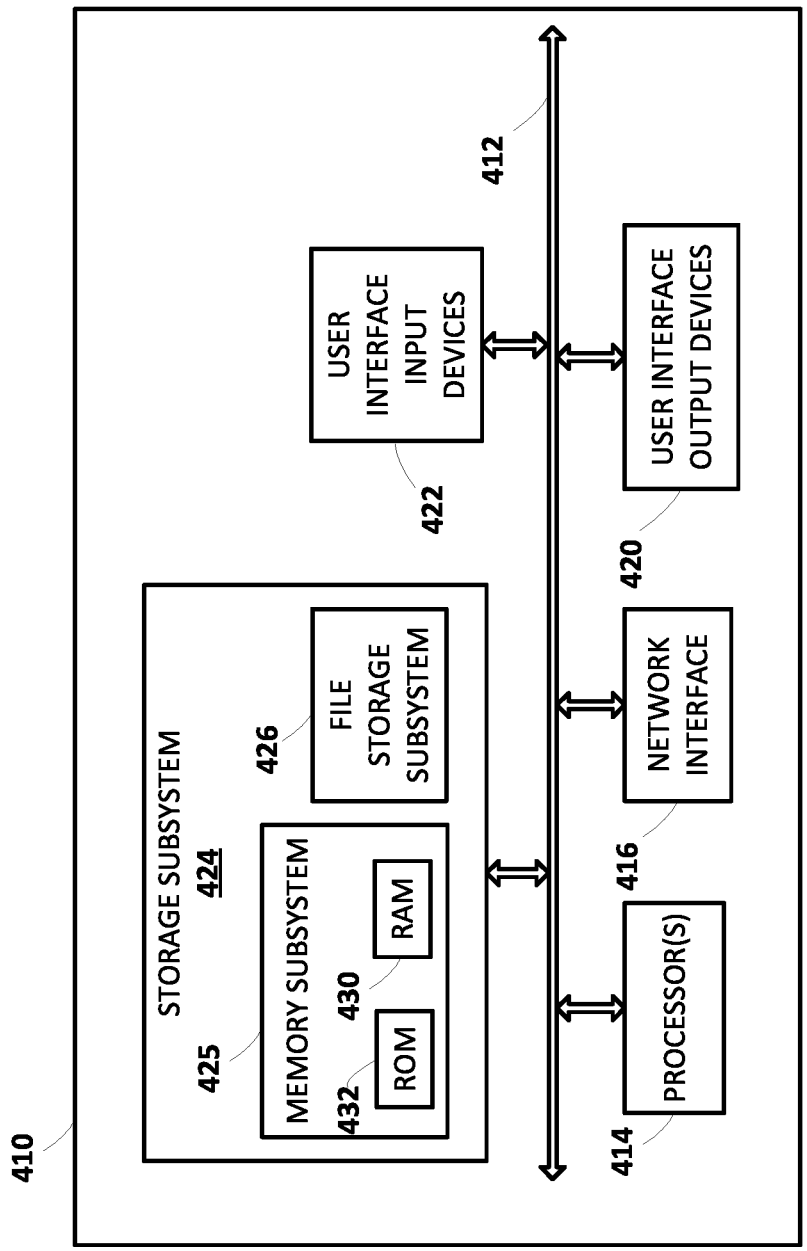
FIG. 4 illustrates an example architecture of a computing device.

FIG. 4 is a block diagram of an example computing device 410 that may optionally be utilized to perform one or more aspects of techniques described herein. Computing device 410 typically includes at least one processor 414 which communicates with a number of peripheral devices via bus subsystem 412. These peripheral devices may include a storage subsystem 424, including, for example, a memory subsystem 425 and a file storage subsystem 426, user interface output devices 420, user interface input devices 422, and a network interface subsystem 416. The input and output devices allow user interaction with computing device 410. Network interface subsystem 416 provides an interface to outside networks and is coupled to corresponding interface devices in other computing devices.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 410 to the user or to another machine or computing device.

Storage subsystem 424 stores programming and data constructs that provide the functionality of some or all of the modules described herein. For example, the storage subsystem 424 may include the logic to perform selected aspects of the methods of FIGS. 2 and 3, as well as to implement various components depicted in FIG. 1.

These software modules are generally executed by processor 414 alone or in combination with other processors. The memory subsystem 425 included in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computing device 410 communicate with each other as intended. Although bus subsystem 412 is shown schematically as a single bus, alternative implementations of the bus subsystem may use multiple busses.

Computing device 410 can be of varying types including a workstation, server, computing cluster, blade server, server farm, or any other data processing system or computing device. Due to the ever-changing nature of computers and networks, the description of computing device 410 depicted in FIG. 4 is intended only as a specific example for purposes of illustrating some implementations. Many other configurations of computing device 410 are possible having more or fewer components than the computing device depicted in FIG. 4.

In situations in which the systems described herein collect personal information about users, or may make use of personal information, the users may be provided with an opportunity to control whether programs or features collect user information (e.g., information about a user's activities, a user's preferences, or a user's current geographic location). Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
   receiving, by a first device, a request from a first user for an action that corresponds to the request to be fulfilled on the first device;
   identifying, by the first device based on the request from the first user, (i) the action, and (ii) a first parameter corresponding to the action;
   determining, by the first device, that fulfillment of the action is to be delegated to a device other than the first device; and
   in response to determining that fulfillment of the action is to be delegated to the device other than the first device:
      selecting, by the first device as the device other than the first device, a second device on which an application corresponding to the action is installed;
      identifying, by the first device, based on the first parameter corresponding to the action, and based on information associated with an account of the first user, a first disambiguated parameter corresponding to the action; and
      sending, by the first device to the second device, a command that specifies the action and the first disambiguated parameter corresponding to the action, to cause the second device to fulfill the action corresponding to the request from the first user, using the application installed on the second device.

2. The method according to claim 1, wherein determining that fulfillment of the action is to be delegated to the device other than the first device is based on determining that the application corresponding to the action is not installed on the first device.

3. The method according to claim 1, wherein selecting, as the device other than the first device, the second device on which the application corresponding to the action is installed, is based on the application corresponding to the action being in a logged-in state on the second device.

4. The method according to claim 3, wherein selecting, as the device other than the first device, the second device on which the application corresponding to the action is installed, is further based on data that indicates that the second device is near the first user.

5. The method according to claim 3, wherein determining that fulfillment of the action is to be delegated to the device other than the first device is based on:
   determining that the action and/or the first parameter requires the application corresponding to the action to be in the logged-in state; and
   determining that the application corresponding to the action is installed on the first device but is not in the logged-in state, or determining that the application corresponding to the action is not installed on the first device.

6. The method according to claim 3, further comprising receiving, from the second device, prior to sending the command, an indication that the application corresponding to the action is in the logged-in state.

7. The method according to claim 1, further comprising determining, by the first device, the account of the first user based on contextual information, and
wherein selecting, as the device other than the first device, the second device is based on the account of the first user.

8. The method according to claim 7, wherein:
the request is included in an utterance, and
determining the account of the first user comprises determining that the utterance is spoken by the first user based on speaker-identification features of the utterance.

9. The method according to claim 7, wherein:
the request is included in an utterance spoken by a person, and
determining the account of the first user comprises:
receiving, from a camera of the first device, an image of the person, and
determining that the utterance is spoken by the first user based on the image.

10. The method according to claim 1, further comprising determining, by the first device, that the first user is authorized to utilize the second device to perform the action corresponding to the request, the second device being associated with an account of a second user,
wherein selecting, as the device other than the first device, the second device is based on determining that the first user is authorized to utilize the second device to perform the action.

11. The method according to claim 1, further comprising identifying, based on the request from the first user, a second parameter corresponding to the action,
wherein:
the command that is sent to the second device further specifies the second parameter corresponding to the action;
the second device identifies, based on the second parameter corresponding to the action, and based on information accessible to the second device, a second disambiguated parameter corresponding to the action; and
the second device utilizes the first disambiguated parameter and the second disambiguated parameter to fulfill the action corresponding to the request from the first user.

12. A computer program product comprising one or more non-transitory computer-readable storage media having program instructions collectively stored on the one or more computer-readable storage media, the program instructions executable to:
receive, by a first device, a request from a first user, wherein the request corresponds to an action that is to be performed by the first device;
identify, by the first device based on the request from the first user, the action corresponding to the request, and a first parameter corresponding to the action;
determine, by the first device, that fulfillment of the action is to be delegated to a device other than the first device; and
in response to determining that fulfillment of the action is to be delegated to the device other than the first device:
select, by the first device as the device other than the first device, a virtual copy of a second device, the second device having installed an application corresponding to the action;
send, by the first device to the virtual copy of the second device, a command that specifies the action and the first parameter corresponding to the action, to cause the virtual copy of the second device to fulfill the action corresponding to the request from the first user, using the application installed on the virtual copy of the second device; and
synchronize (i) the virtual copy of the second device and (ii) the second device.

13. The computer program product according to claim 12, wherein determining that fulfillment of the action is to be delegated to the device other than the first device is based on determining that the application corresponding to the action is not installed on the first device.

14. The computer program product according to claim 12, wherein selecting, as the device other than the first device, the virtual copy of the second device, is based on the application corresponding to the action being in a logged-in state on the virtual copy of the second device.

15. The computer program product according to claim 14, wherein selecting, as the device other than the first device, the virtual copy of the second device, is further based on data that indicates that the second device is near the first user.

16. The computer program product according to claim 14, wherein determining that fulfillment of the action is to be delegated to the device other than the first device is based on:
determining that the action and/or the first parameter requires the application corresponding to the action to be in the logged-in state; and
determining that the application corresponding to the action is installed on the first device but is not in the logged-in state, or determining that the application corresponding to the action is not installed on the first device.

17. The computer program product according to claim 14, the program instructions further being executable to receive, from the virtual copy of the second device, prior to sending the command, an indication that the application corresponding to the action is in the logged-in state.

18. The computer program product according to claim 12, the program instructions further being executable to determine, by the first device, an account of the first user based on contextual information, and
wherein selecting, as the device other than the first device, the virtual copy of the second device is based on the account of the first user.

19. The computer program product according to claim 18, wherein:
the request is included in an utterance, and
determining the account of the first user comprises determining that the utterance is spoken by the first user based on speaker-identification features of the utterance.

20. A system comprising:
a processor, a computer-readable memory, one or more computer-readable storage media, and program instructions collectively stored on the one or more computer-readable storage media, the program instructions executable to:
receive, by a first device, a request from a first user, wherein the request corresponds to an action that is to be performed by the first device;
identify, by the first device based on the request from the first user, (i) the action that corresponds to the request and (ii) a first parameter corresponding to the action;
determine, by the first device, that fulfillment of the action is to be delegated to a device other than the first device; and in response to determining that fulfillment of the action is to be delegated to the device other than the first device:
   select, by the first device as the device other than the first device, a second device on which an application corresponding to the action is installed;
   identify, by the first device, based on the first parameter corresponding to the action, and based on information associated with an account of the first user, a first disambiguated parameter corresponding to the action; and
   send, by the first device to the second device, a command that specifies the action and the first disambiguated parameter corresponding to the action, to cause the second device to fulfill the action corresponding to the request from the first user, using the application installed on the second device.

* * * * *